United States Patent Office 3,542,923
Patented Nov. 24, 1970

3,542,923
METHOD FOR PROTECTING INANIMATE MATERIALS AGAINST INSECT ATTACK
Geoffrey Tattersall Newbold, Glen Orchy, Rookery Lane, Wendens Ambo, and David Thomas Saggers, Larks Rise, Sewards End, both of Saffron Walden, Essex, England
No Drawing. Filed Feb. 23, 1966, Ser. No. 529,248
Claims priority, application Great Britain, Feb. 23, 1965, 7,680/65; Mar. 4, 1965, 9,208/65; July 13, 1965, 29,586/65; July 31, 1965, 32,884/65
Int. Cl. A01n 9/22
U.S. Cl. 424—248
4 Claims

ABSTRACT OF THE DISCLOSURE

There is disclosed a method for the protection of materials subject to insect attack from damage therefrom. The susceptible materials are treated with a composition which contains an insecticidally effective amount of a compound of the formula

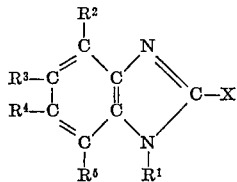

wherein $R^1$ is hydrogen, a lower alkyl group or —$COOR^6$, where $R^6$ is alkyl, substituted alkyl, aryl or substituted aryl, and $R^2$, $R^3$, $R^4$ and $R^5$ are the same or different and are selected from the group comprising hydrogen, alkyl, hydroxy, alkoxy, nitro, halogen, pseudo-halogen, substituted alkyl, carboxy, carboxy ester, carbonamido, N-substituted or disubstituted carbonamido, amino or mono or disubstituted amino, thiol, alkylthiol and oxygenated derivatives thereof, sulphonic acid and esters and amides thereof and substituted amides and a heterocyclic ring attached to the benzimidazole system through a nitrogen atom, radicals and where X is trifluoromethyl or pentafluoroethyl, or a salt or functional derivative of said benzimidazole, where such exist.

---

The present invention relates to novel insecticidal processes.

It has been found that the substituted benzimidazoles as hereinafter defined are active as insecticides, many of them being highly active. These compounds are capable of use generally as insecticides; however, they are particularly suited to industrial uses where they are employed to protect susceptible materials such as textiles, paper, wood etc. from the ravages of insects and in some cases to render such materials immune to attack. A particularly important use is mothproofing of textiles and fabrics.

Thus the compounds of the invention although being insecticides are especially mothproofing agents, agents against keratin-eating insects and agents for the protection of keratinic material against insect attack.

Accordingly the present invention covers the use, as an insecticide, of a substituted benzimidazole as hereinafter defined. One general embodiment of the invention is the use of the substituted benzimidazoles for the treatment of plants, the soil, land or aquatic areas, for the purpose of insect control. A preferred embodiment of the invention is the process of treating inaminate materials susceptible to insect attack by applying thereto or incorporating therein a substituted benzimidazole as hereinafter defined. The invention particularly covers this use for mothproofing. The invention is also for the materials treated in accordance with the invention.

By the term "substituted benzimidazole" as used in this specification is meant a compound of the formula:

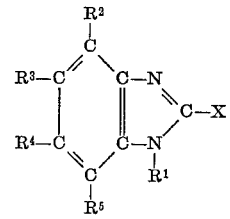

wherein $R^1$ is hydrogen, a lower alkyl group or —$COOR^6$, where $R^6$ is alkyl (for example of 1–6 carbon atoms, such as methyl, ethyl or propyl), substituted alkyl (for example chloromethyl or bromoethyl), aryl (for example phenyl or naphthyl) or substituted aryl (for example tolyl or xylyl), and $R^2$, $R^3$, $R^4$ and $R^5$ are the same or different and are selected from the group comprising hydrogen, alkyl (for example 1–6 carbon atoms such as methyl, ethyl or propyl), hydroxy, alkoxy (for example methoxy, ethoxy, or butoxy), nitro, halogen (for example chloro, bromo or fluoro), pseudo-halogen (for example cyano, thiocyano, isothiocyano or azido), substituted alkyl (for example trifluoromethyl, chloromethyl, bromomethyl, trichloromethyl, hydroxymethyl, 2-chloroethyl, 2-hydroxyethyl or 2-methoxyethyl), carboxy, carboxy ester, carboxy amide, N substituted or disubstituted carboxy amide, amino or mono or disubstituted amino (for example methylamino, dimethylamino, acetylamino, trifluoroacetylamino, benzenesulphonamido, paratoluenesulphonamido, methanesulphonamido), thiol, alkylthiol and oxygenated derivatives thereof (for example —$SOR^7$ or —$SO_2R^7$ where $R^7$ is alkyl), sulphonic acid and esters and amides thereof and substituted amides (for example phenylsulphamyl, ethylsulphamyl, chloroethylsulphamyl) and a heterocyclic ring attached to the benzimidazole system through a nitrogen atom, radicals and where X is trifluoromethyl or pentafluoroethyl, or a salt or functional derivative of said benzimidazole, where such exist.

Salts of the substituted benzimidazoles embraced by the present invention may comprise ammonium salts, metal salts such as for example sodium, potassium, calcium, zinc, copper and magnesium salts, amine salts such as for example methylamine, ethylamine, dimethylamine, triethylamine, ethanolamine, triethanolamine and benzylamine salts. According to a preferred embodiment the salts are alkali metal salts. Generally the alkali metal salts are crystalline solids, readily soluble in water.

The salts may be prepared by reacting the benzimidazole in aqueous or aqueous-organic solvent solution or suspension with an alkaline compound of the metal, such as the hydroxide, or with the amine, as appropriate. The metal salts may also be prepared by metathesis for example between the alkali metal salt of the benzimidazole and a salt of the metal. Some of the benzimidazoles are also basic and can form salts with strong acids such as hydrochloric acid.

Many of the compounds according to the present invention possess fungicidal as well as insecticidal activity, and consequently the objects treated may also be rendered anti-fungal.

The invention is of particular application in the treatment of inanimate matter. The materials so treated may comprise for example wood, paper, timber, fabrics, synthetic fibres, plastics, sacking, jute, grain, flour, paint and varnish compositions, adhesives, glues, materials of construction, etc.

The process for the treatment of inanimate materials may comprise any method of contact or incorporation. Thus for example the materials may be sprayed, coated or impregnated with a solution or suspension containing the substituted benzinidazole, or if desired the material may be dipped in a bath containing said compound. Impregnation may be carried out for example at reduced pressure or at high pressure or at high temperature, if so desired. Where appropriate the substituted benzimidazole may be incorporated into the materials to be treated. Thus for example the substituted benzimidazole may be incorporated into paint, varnish or dye compositions; the resulting composition is resistant to insect attack as are articles painted or treated with them.

It is also possible to incorporate the substituted benzimidazole into synthetic fibres or plastics during manufacture. Thus for example, in the case of viscose, the substituted benzimidazole may be incorporated during manufacture by inclusion in the solution prior to coagulation and spinning. The compounds may also readily be incorporated in building materials such as plaster.

Many of the substituted benzimidazoles exhibit prolonged activity on the inanimate materials. The activity may persist for many months, or more, and in some cases is resistant to washing operations.

A specially preferred embodiment of the invention is the treatment of fibres, yarns and textiles for mothproofing and related purposes. As indicated, with the synthetic fibres it is possible to incorporate the compounds during manufacture. With other fibres and textiles, the treatment according to the invention may be carried out in any of the conventional ways including dipping and spraying as a separate operation or combined with other treatments such as dyeing flameproofing, waterproofing etc.

The substituted benzimidazoles where $R^1$ is hydrogen are soluble in alkaline liquors as their salts, for example as alkali and metal salts. Such solutions may be used in a dipping bath. If desired, dipping may also be carried out in an acid bath; in such cases the substituted benzimidazoles may be added as fine suspensions of wettable powders or as emulsifiable oil solutions with suspending agents to prevent flocculation and precipitation. Alternatively the substituted benzimidazoles may be applied in solution in a volatile organic solvent, for example a solvent used in dry cleaning such as trichloroethylene.

The present invention also embraces the inanimate materials treated by the process as identified.

According to a specially preferred embodiment, the invention is for a process for the mothproofing of fabrics and textiles which comprises contacting them with a substituted benzimidazole of the formula:

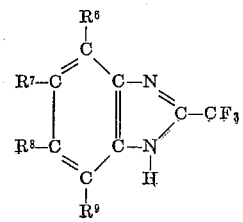

wherein $R^6$, $R^7$, $R^8$ and $R^9$ are hydrogen, halogen (for example chlorine, bromine, iodine or fluorine) or a saturated heterocyclic ring attached through a nitrogen atom (for example piperidine or morpholine) at least two of said groups being halogen and not more than one of said groups being a saturated heterocyclic ring.

Compounds which have been found specially active for mothproofing include 4,5,6-trichloro-7-bromo-2-trifluoromethyl benzimidazole, 4,5,6-trichloro-7-(1'-piperidino)-2-trifluoromethyl benzimidazole, 4,5,7-tribromo-2-trifluoromethyl benzimidazole and 4,5-dibromo-6,7-dichloro-2-trifluoromethyl benzimidazole.

Although the present invention is primarily concerned with the treatment of inanimate materials, and especially mothproofing textiles and fabrics, the present invention also extends to the treatment of living organisms for insect destruction. Thus for example compositions containing the substituted benzimidazoles may be applied to animals and plants for insect destruction.

The insects and pests against which the present invention provides protection include flying insects such as flies, mosquitoes, butterflies, moths, beetles, aphids, etc., crawling pests such as larvae, caterpillars, spiders, beetles, etc. The present invention has special application in providing protection against beetles and moth larvae.

The compounds according to the invention kill insects when ingested and also have a good persistent contact action when adult insects or larvae walk or crawl on surfaces treated with the compound.

The compositions of the substituted benzimidazoles used according to the present invention may be conventional. These compounds may be incorporated into an aqueous solution or suspension with or without one or more of the materials comprising wetting agents, stickers, antiflocculants and the like. In many cases it is most convenient to use an aqueous solution of a salt of the substituted benzimidazole in the treatment of materials according to the invention. Thus in the treatment of textiles, the treatment according to the present invention may be combined with a conventional washing operation.

Alternatively the substituted benzimidazole may be dissolved or dispersed in an organic solvent or non-solvent with or without a wetting agent. Such solvents include natural vegetable oil, such as olive oil or archis oil, or petroleum oils.

The substituted benzimidazole may also be mixed with a wetting agent, with or without the incorporation of powdered or divided solid materials as referred to above, so that a wettable product is obtained which is capable of use as such or as a suspension or dispersion in water or other liquid diluents.

The substituted benzimidazole may be incorporated for example with solid inert media comprising powdered or divided solid materials, for example clays, sands, talc, mica, fertilizers, and the like, such products either comprising dust or larger particle size materials.

The wetting agents used may comprise anionic compounds such as for example soaps, fatty sulphate esters such as dodecyl sodium sulphate, fatty aromatic sulphonates such as alkylbenzene sulphonates or butylnaphthalene sulphonates, more complex fatty sulphonates such as the amide condensation product of oleic acid and N-methyl taurine or sodium sulphonate of dioctyl succinic acid. The wetting agents may also comprise non-ionic agents such as for example condensation products of fatty acids, fatty alcohols or fatty substituted phenols with ethylene oxide, or fatty esters and ethers of sugar or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

The following examples are given to illustrate the present invention; parts and percentages are by weight unless otherwise indicated.

EXAMPLES 1–10

An acetone concentrate of each of the substituted benzimidazole indicated below was diluted in water to give solutions containing 30 and 100 parts per million (p.p.m.) of active ingredient. These solutions were sprayed onto 2 cm. discs of French bean leaves mounted on wet filter paper and the discs were then covered with adults of greenhouse red spider mite (*Tetranychus telarius*). With every compound a complete kill of the mites was obtained within 24 hours at both concentrations.

(1) 5-nitro-2-trifluoromethyl benzimidazole.
(2) 4-chloro-6-bromo-2-trifluoromethyl benzimidazole.
(3) 4,5,6-trichloro-2-trifluoromethyl benzimidazole.
(4) 4-bromo-6-chloro-2-trifluoromethyl benzimidazole.
(5) 6-chloro-4-nitro-2-trifluoromethyl benzimidazole.
(6) 4-nitro-6-bromo-2-trifluoromethyl benzimidazole.
(7) 1-carbisopropoxy-4,5,6-trichloro-2-trifluoromethyl benzimidazole.
(8) 5-chloro-6-nitro-2-trifluoromethyl benzimidazole.
(9) 1-carbomethoxy-4,5,6-trichloro-2-trifluoromethyl benzimidazole.
(10) 5,6-dichloro-1-methyl-2-trifluoromethyl benzimidazole.

EXAMPLES 11–25

An acetone solution of each of the substituted benzimidazole indicated below was sprayed onto 7 cm. discs of cabbage leaves so as to give coatings of 3 micrograms of active ingredient per square centimetre. After the solvent had evaporated the discs were placed in 9 cm. Petri dishes and each infested with ten second instar larvae of the Cabbage-white butterfly (*Pieris brassicae*). With every compound complete kill of the larvae was obtained within 24 hours.

(11) 4-morpholino-5,6,7-trichloro-2-trifluoromethyl benzimidazole.
(12) 5-cyano-2-trifluoromethyl benzimidazole.
(13) 5,6-dichloro-2-trifluoromethyl benzimidazole.
(14) 4,7-dichloro-2-trifluoromethyl benzimidazole.
(15) 4,7-dibromo-2-trifluoromethyl benzimidazole.
(16) 6-chloro-4-nitro-2-trifluoromethyl benzimidazole.
(17) 5-chloro-6-nitro-2-trifluoromethyl benzimidazole.
(18) 4,5,6-trichloro-2-trifluoromethyl benzimidazole.
(19) 4,6,7-trichloro-2-trifluoromethyl benzimidazole.
(20) 5-fluoro-4,6,7-trichloro-2-trifluoromethyl benzimidazole.
(21) 5-bromo-4,6,7-trichloro-2-trifluoromethyl benzimidazole.
(22) 1-methyl-4,5,6,7-tetrachloro-2-trifluoromethyl benzimidazole.
(23) 1-carbomethoxy-4,5,6-trichloro-2-trifluoromethyl benzimidazole.
(24) 1-carbisopropoxy-4,5,6-trichloro-2-trifluoromethyl benzimidazole.
(25) 1-carbophenoxy-4,5,6-trichloro-2-trifluoromethyl benzimidazole.

EXAMPLES 26–34

9 centimetre diameter filter papers were treated with acetone solutions of the substituted benzimidazole indicated below and when the solvent had evaporated, were placed in crystallising dishes (9 cm. x 4 cm.). The concentrations of the solutions were adjusted so that 1 millilitre aliquots deposited on the papers produced deposits equivalent to 300, 100 and 30 mg./sq. foot.

Adault female houseflies (*Musca domestica*), lightly anaesthetised with carbon dioxide were then introduced into the dishes and a glass lid placed over each. When examined after 24 hours, all treatments were found to have given a complete kill of the insects.

(26) 4-chloro-2-trifluoromethyl benzimidazole.
(27) 4-nitro-2-trifluoromethyl benzimidazole.
(28) 4,7-dichloro-2-trifluoromethyl benzimidazole.
(29) 6-chloro-4-nitro-2-trifluoromethyl benzimidazole.
(30) 1-methyl-4,5,7-trichloro-2-trifluoromethyl benzimidazole.
(31) 6-bromo-4-nitro-2-trifluoromethyl benzimidazole.
(32) 1-carboisopropoxy-4-chloro-6-bromo-2-trifluoromethyl benzimidazole.
(33) 1-carbophenoxy-6-chloro-4-nitro-2-trifluoromethyl benzimidazole.
(34) 4-bromo-2-trifluoromethyl benzimidazole.

EXAMPLES 35–40

Acetone solutions of the benzimidazole indicated below were added to flour at rates giving 300, 100 and 30 p.p.m. weight of active ingredient per weight of flour. After the solvent had evaporated, the flour at each level of concentration was thoroughly mixed. Portions of the treated flour were placed in glass tubes (7.5 x 2.5 cms.) and ten adult flour beetles (*Tribolium confusum*) added to each tube. After 5 days all treatments with all the compounds were found to have given a complete kill of the beetles.

(35) 4,6,7-trichloro-2-trifluoromethyl benzimidazole.
(36) 1-methyl-4-bromo-5,6,7-trichloro-2-trifluoromethyl benzimidazole.
(37) 5-fluoro-4,6,7-trichloro-2-trifluoromethyl benzimidazole.
(38) 1-methyl-5-fluoro-4,6,7-trichloro-2-trifluoromethyl benzimidazole.
(39) 5-bromo-4,6,7-trichloro-2-trifluoromethyl benzimidazole.
(40) 1-methyl-4,5,6,7-tetrachloro-2-trifluoromethyl benzimidazole.

EXAMPLES 41–46

The substituted benzimidazoles indicated below were formulated into wettable powders of the following composition:

| | Percent |
|---|---|
| Substituted benzimidazole | 25 |
| Dispersing agent (Dyapol PT) | 5 |
| Wetting agent (Hoe S2/268) | 1 |
| China clay | 69 |

The compositions were suspended in water and sprayed onto copy paper so as to give deposits of the substituted benzimidazole of 30 mg., 10 mg. and 3 mg. per square foot.

Adult female mosquitoes (*Aedes aegypti*) were transferred to cages using this copy paper as the floor and were then removed to normal storage cages after 1, 2 and 4 hours exposure. Mortalities were assessed 24 hours, and are given in the following table, expressed as percent kill.

| Compound | Exposure time, hrs. | Mortalities 30 mg., per sq. ft. | 10 mg., per sq. ft. | 3 mg., per sq. ft. |
|---|---|---|---|---|
| (41) 4,7-dichloro-2-trifluoromethyl benzimidazole. | 1 | 0 | | |
| | 2 | 63 | | |
| | 3 | 100 | | |
| (42) 6-chloro-4-nitro-2-trifluoromethyl benzimidazole. | 1 | 100 | 100 | 100 |
| (43) 4-chloro-2-trifluoromethyl benzimidazole. | 1 | 83 | | |
| | 2 | 100 | | |
| (44) 4-nitro-2-trifluoromethyl benzimidazole. | 1 | 71 | | |
| | 2 | 100 | | |
| (45) 6-bromo-2-trifluoromethyl benzimidazole. | 1 | 100 | | |
| (46) 6-bromo-4-nitro-2-trifluoromethyl benzimidazole. | 1 | 100 | 100 | 100 |

EXAMPLES 47–53

Filter papers were treated with aqueous sugar solutions containing the sodium salt of the substituted benzimidazole indicated below, so as to give a deposit of the active ingredient of 100 mg./square foot.

Adult houseflies (*Musca domestica*) were transferred to cages containing this filter paper on the floor, and left for 24 hours, and mortality observed. In each case 100% mortality was obtained. The papers were stored in the open and at intervals the papers were tested again, to determine the number of days storage required for the mortality to fall to 50%. This persistence time in days is given in the table below.

| Compound: | Persistence time, days |
|---|---|
| (47) 4,7-dichloro-2-trifluoromethyl benzimidazole | 43 |
| (48) 6-chloro-4-nitro-2-trifluoromethyl benzimidazole | 56 |
| (49) 4-chloro-2-trifluoromethyl benzimidazole | 26 |
| (50) 4-nitro-2-trifluoromethyl benzimidazole | 20 |
| (51) 6-bromo-2-trifluoromethyl benzimidazole | 20 |
| (52) 1-carbophenoxy-6-chloro-4-nitro-2-trifluoromethyl benzimidazole | Over 57 |
| (53) 6-bromo-4-nitro-2-trifluoromethyl benzimidazole | Over 57 |

EXAMPLES 54–55

Absorbent cotton wool pads (approximately 9 centimetres diameter by 1 centimetre thickness) were placed in Petri dishes (9 centimetres diameter) and soaked with 10 millilitres of a solution containing 0.1% of the sodium salt of the substituted benzimidazole indicated below and 5% of glucose. Other pads were prepared using glucose and water only. The pads were placed in cages (12 x 12 x 12 inches) containing a mixed population of about 100 flies. The cages contained either one treated and one untreated pad or two untreated pads. When the cages were examined after 16 hours all the flies in those containing a treated pad were found to have been killed, as compared with no kill in the control cages. The pads were then removed and after moistening with distilled water to replace evaporation losses placed in a second series of cages. Again after 16 hours all flies in those containing the treated pads were found to have been killed. The experiment was continued for one month during which time the treated pads always gave a complete kill during the exposure period.

In a separate experiment, a treated pad only was placed in a cage containing a mixed population of flies, the cage being provided with an operating armhole. The flies were kept under observation and as soon as one had been seen to probe the pad with its proboscis for 30 seconds it was transferred to a separate storage cage. The flies were all found to be dead when observed four hours after transfer.

(54) 4,7-dichloro-2-trifluoromethyl benzimidazole.
(55) 4-nitro-6-chloro-2-trifluoromethyl benzimidazole.

EXAMPLE 56

A suspension containing 1 part of 6-bromo-4-nitro-2-trifluoromethyl benzimidazole in 1000 parts of water was prepared by diluting a 20% solution in acetone with a 0.05% solution of octyl cresol polyethylene oxide condensate in water. This was further diluted to give suspension containing 600, 300 and 100 p.p.m. of active compound and these were sprayed at a rate equivalent to 50 gals./acre on young field beans (*Vicia faba*) infested with adult apterous vetch aphids (*Megoura viciae*). After treatment the plants were enclosed in glass cages with gauze tops for ventilation. All treatments produced complete kill of the aphids in 24 hours as compared with no kill on control plants.

EXAMPLE 57–81

0.1 gram of each of the substituted benzimidazole indicated below were dissolved in 20 millilitres of ethylene glycol monomethyl ether. This solution was stirred at room temperature with 400 mililitres of water. 10 grams of previously well wetted wool flannel were introduced into this liquor and, with good agitation, the liquor was heated to 90° C. for 15 minutes, then 80% formic acid in amount comprising 2% of the flannel was added, and the flannel agitated in the liquor for another 30 minutes at the same temperature. The bath was then cooled and the treated wool flannel well rinsed under running tap water, centrifuged and dried.

The dried flannel was then tested as to fastness against *Tineolla bisseliella* (moth) caterpillars and larvae of *Attagenus piceus* and *Anthrenus vorax* by the methods set out in the Swiss Association for Standardisation leaflets No. 95,901 and 95,902. This was done by exposing 4 pieces cut from the material of the same size to attack by the caterpillars or larvae for 14 days under constant temperature and humidity conditions (28° c./65% humidity). Fifteen caterpillars or larvae were placed on each piece of material. The facts determined by the test were as follows:

(*a*) the number surviving out of thirty caterpillars or larvae,
(*b*) the average relative loss in weight of the pieces of material calculated on an untreated sample of the same size under the same conditions.

With every compound, there was a complete kill of the caterpillars or larvae, and the loss in weight of the fibre was in the range 0–5%. With the control samples, all thirty caterpillars or larvae were alive, and the loss in weight of the fibre was in the range 50–100%.

(57) 2,5-bis-trifluoromethyl benzimidazole,
(58) 5-fluoro-4,6,7-trichloro-2-trifluoromethyl benzimidazole,
(59) 4-nitro-6-chloro-2-trifluoromethyl benzimidazole,
(60) 4,5,6,7-tetrabromo-2-trifluoromethyl benzimidazole,
(61) 4,7-dichloro-2-trifluoromethyl benzimidazole,
(62) 5-bromo-4,6,7-trichloro-2-trifluoromethyl benzimidazole,
(63) 4,5,6-trichloro-2-trifluoromethyl benzimidazole,
(64) 4,5,7-tribromo-2-trifluoromethyl benzimidazole,
(65) 4,5,7-trichloro-2-trifluoromethyl benzimidazole,
(66) 4,5-dichloro-6-bromo-2-trifluoromethyl benzimidazole,
(67) 4,5,6,7-tetrachloro-2-trifluoromethyl benzimidazole,
(68) 4,6-dibromo-5,7-dichloro-2-trifluoromethyl benzimidazole,
(69) 4,7-dibromo-2-trifluoromethyl benzimidazole,
(70) 4,5-dibromo-6,7-dichloro-2-trifluoromethyl benzimidazole,
(71) 5,6-dibromo-4,7-dichloro-2-trifluoromethyl benzimidazole,
(72) 4,6,7-tribromo-5-chloro-2-trifluoromethyl benzimidazole,
(73) 4,6,7-tribromo-5-fluoro-2-trifluoromethyl benzimidazole,
(74) 4,5,6-tribromo-7-chloro-2-trifluoromethyl benzimidazole,
(75) 4,5,6-trichloro-7-(1'-piperidino)-2-trifluoromethyl benzimidazole,
(76) 4,7-dibromo-5,6-dichloro-2-trifluoromethyl benzimidazole,
(77) 4,5,6-trichloro-7-bromo-2-trifluoromethyl benzimidazole,
(78) 4,7-dibromo-5-chloro-2-trifluoromethyl benzimidazole,
(79) 2,5-bis-trifluoromethyl-6-chloro-benzimidazole,
(80) 1-methyl-4,5,6,7-tetrachloro-2-trichloromethyl benzimidazole,
(81) 4-(4'-morpholino)-5,6,7-trichloro-2-trifluoromethyl benzimidazole.

EXAMPLES 82–97

Two parts of each of the substituted benzimidazoles indicated below were incorporated into 98 parts of a usual commercial light duty detergent for textiles which comprises, for example, 20 to 30% sodium dodecylbenzene sulphonate or sodium lauryl alcohol sulphate, 5 to 10% sodium tripolyphosphate or sodium ethylenediamine tetraacetate, and 60 to 75 parts of sodium sulphate. A washing liquor was prepared which contained 2.5% of the light duty detergent mixed with the substituted benzimidazole and wool flannel was washed therein at 35–40° C. (liquor to wool ratio 20:1). The washed wool sample was then rinsed with cold water, centrifuged and dried.

The dried sample was then tested as to fastness against *Tineolla biseliella* (moth) caterpillars and larvae of *Attagenus piceus* and *Anthrenus vorax* by the methods set out in the Swiss Association for Standardisation leaflets No. 95,901 and 95,902. This was done by exposing 4 pieces cut from the material of the same size to attack by the caterpillars or larvae for 14 days under constant temperature and humidity conditions (28° C./65% humidity). Fifteen caterpillars or larvae were placed on each piece of material.

The facts determined by the test were as follows:

(a) the number surviving out of thirty caterpillars or larvae.
(b) the average relative loss in weight of the pieces of material calculated on an untreated sample of the same size under the same conditions.

With every compound, there was a complete kill of the caterpillars or larvae and the loss in weight of the fibre was 0–5%. With the control samples, all thirty caterpillars or larvae were alive and the loss in weight of the fibre was in the range 50–100%.

Similar results were also obtained where the wool was dry cleaned with dry cleaning solvents which contain corresponding amounts of the substituted benzimidazole indicated below.

(82) 4,5,6,7-tetrabromo-2-trifluoromethyl benzimidazole,
(83) 4,5,6-trichloro-7-bromo-2-trifluoromethyl benzimidazole,
(84) 4,7-dichloro-2-trifluoromethyl benzimidazole,
(85) 4,5,6-trichloro-7-(1'-piperidino)-2-trifluoromethyl benzimidazole,
(86) 4,5,6-trichloro-2-trifluoromethyl benzimidazole,
(87) 4,5,7-tribromo-2-trifluoromethyl benzimidazole,
(88) 4,5,7-trichloro-2-trifluoromethyl benzimidazole,
(89) 4,5-dibromo-6,7-dichloro-2-trifluoromethyl benzimidazole,
(90) 4,7-dibromo-2-trifluoromethyl benzimidazole,
(91) 2,5-bis-trifluoromethyl benzimidazole,
(92) 4-nitro-6-chloro-2-trifluoromethyl benzimidazole,
(93) 4,5,6,7-tetrachloro-2-trifluoromethyl benzimidazole,
(94) 4,7-dibromo-5-chloro-2-trifluoromethyl benzimidazole,
(95) 2,5-bis-trifluoromethyl-6-chloro-benzimidazole,
(96) 1-methyl-4,5,6,7-tetrachloro-2-trifluoromethyl benzimidazole,
(97) 4-(4'-morpholino)-5,6,7-trichloro-2-trifluoromethyl benzimidazole.

EXAMPLES 103–105

An acetone solution of the compound was sprayed onto 7 cm. diameter discs of cabbage leaf at such a concentration and volume as to produce deposits of 65, 13 and 6.5 micro-grams/sq. cm. After the solvent had evaporated the discs were placed in 9 cm. diameter Petri dishes and infested with ten second instar larvae of the cabbage white butterfly—*Pieris brassica*. The mortalities obtained after 48 hours exposure are summarised in the following table.

| Compound | Percent mortality at— | | |
|---|---|---|---|
| | [1] 65 | [1] 13 | [1] 6.5 |
| (98) 4-bromo-2-trifluoromethyl benzimidazole | 100 | 90 | 60 |
| (99) 4,5,6 7-tetrachloro-2-trifluoromethyl benzimidazole | 100 | 40 | 0 |
| (100) 4,5,6,7-tetra-bromo-2-trifluoromethyl benzimidazole | 100 | 100 | 100 |
| (101) 4,6-dibromo-5,7-dichloro-2-trifluoromethyl benzimidazole | 100 | 100 | 100 |
| (102) 4,6-di-iodo-2-trifluoromethyl benzimidazole | 100 | 40 | |

[1] Micro grams per square centimetre.

EXAMPLES 103–105

Acetone concentrates of the compounds were diluted in water to give solutions containing 1000, 300 and 100 parts per million (p.p.m.) of active ingredient. 2 cm. diameter discs of french bean leaf (*Phaseolus vulgaris*) were sprayed with the solution which were then placed in moist filter papers and immediately infested with 20 adult red spider mites—*Tetranychus telarius*. The discs were examined after 48 hours when the mortality was recorded. The results are summarized in the table below.

| Compound | Percent mortality at— | | |
|---|---|---|---|
| | 1,000 p.p.m. | 300 p.p.m. | 100 p.p.m. |
| (103) 4,6-di-iodo-2-trifluoromethyl benzimidazole | 100 | 100 | 100 |
| (104) 5-bromo-4-nitro-2-trifluoromethyl benzimidazole | 100 | 100 | 100 |
| (105) 4,6-dibromo-5,7-dichloro 2-trifluoromethyl benzimidazole | 100 | 100 | 100 |

EXAMPLES 106–108

Acetone concentrates of the compounds were added to wholemeal flour to produce concentrations of 300 and 100 p.p.m. wt. of compound per wt. of flour. The treated flour was placed in small glass specimen tubes (3" x 1") and 10 adult flour beetles *Tribolium confusum* added to each. After 10 days incubation at 25° C. and 60% relative humidity the mortality of the beetles was assessed. The results given in the table below.

| Compound | Percent mortality at— | |
|---|---|---|
| | 300 p.p.m. | 100 p.p.m. |
| (106) 4,6-di-iodo-2-trifluoromethyl benzimidazole | 100 | 40 |
| (107) 4,5,6,7-tetra-bromo-2-trifluoromethyl benzimidazole | 100 | 100 |
| (108) 4,7-dibromo-5,7-dichloro-2-trifluoromethyl benzimidazole | 100 | 100 |

EXAMPLES 109–110

2-trifluoromethyl - 4,7 - dichloro-5,6-dibromobenzimidazole (No. 109) and 2-trifluoromethyl-5-chloro-4,6,7-tribromobenzimidazole (No. 110) were applied to the wool following the procedure described in Examples 57–81 at 60° C. Afterwards the samples were treated twice for 30 minutes at 40° C. in a water bath containing 5 grams pure soap powder in one litre of water. The wool to water ratio in this washing process was 1:50. After rinsing the wool samples twice in cold water the wool flannels were tested biologically, following the procedure given in Examples 57–81. The concentration of active ingredient calculated on wool weight was 0.1%. For comparison the same process was applied to a control comprising untreated wool flannel. The results are given in the table below.

In this table $a$ = the number surviving out of 30 caterpillars or larvae
$b$ = the average relative loss in weight in milligrams of the wool

TABLE

| Compound | Moth caterpillars | | Larvae of— | | | |
|---|---|---|---|---|---|---|
| | | | Attagenus | | Anthrenus | |
| | a | b | a | b | a | b |
| No. 109 | 0 | 1.3 | 0 | 3.7 | 0 | 1.5 |
| No. 110 | 0 | 2.4 | 0 | 3.9 | 0 | 1.2 |
| Control | 30 | 142.7 | 30 | 88.8 | 30 | 125.4 |

In the process of the invention, where this is concerned with the preservation of wood and fabrics it may be desirable to include a fungicide, such as pentachlorphenol, lauryl pentachlorphenate, salicylicanilide or copper naphthenate in the treatment. The chemical stability of the compounds according to the invention makes them particularly suitable for such combined use. They may also be used in association with other insecticides. The compounds of the invention are strongly absorbed on wool fibres, which ensures their retention during washing processes but reduces their activity to insects which do not feed on the fibre. A less strongly held additional insecticide, such as DDT, may, therefore, be desirable if the simultaneous control by contact of a non-keratin feeding insect such as the body louse is necessary.

What is claimed is:

1. A method for protecting inanimate materials susceptible to insect damage against insect attack which comprises treating the inanimate material with an insecticidally effective amount of a member selected from the group consisting of (a) substituted benzimidazole of the formula

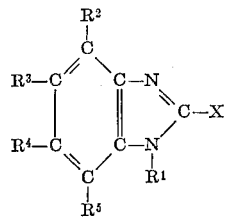

wherein $R^1$ is selected from the group consisting of hydrogen, lower alkyl and —$COOR^6$, $R^6$ is selected from the group consisting of lower alkyl, and phenyl, $R^2$, $R^3$, $R^4$ and $R^5$ are the same or different member selected from the group consisting of hydrogen, lower alkyl, hydroxy, lower alkoxy, nitro, halogen, cyano, halo lower alkyl, and a heterocyclic ring attached to the benzimidazole ring through a nitrogen atom, and selected from the group consisting of piperidino and morpholino and X is selected from the group consisting of trifluoromethyl and pentafluoroethyl, and (b) metal, ammonium or amine salts thereof.

2. A method for the protection of keratinic material against insect attack which comprises applying to the keratinic material an insecticidally effective amount of a member of the group consisting of substituted benzimidazole of the formula

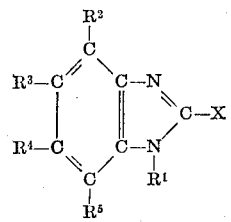

wherein $R^1$ is selected from the group consisting of hydrogen, lower alkyl and —$COOR^6$, $R^6$ is selected from the group consisting of lower alkyl and phenyl, $R^2$, $R^3$, $R^4$ and $R^5$ are the same or different members selected from the group consisting of hydrogen, lower alkyl, hydroxy, lower alkoxy, nitro, halogen, cyano, halo lower alkyl, and a heterocyclic group attached to the benzimidazole ring through a nitrogen atom, and selected from the group consisting of piperidino and morpholino, and X is selected from the group consisting of trifluoromethyl and pentafluoroethyl, and metal, ammonium or amine salts thereof.

3. A method as in claim 2 wherein the benzimidazole is of the formula

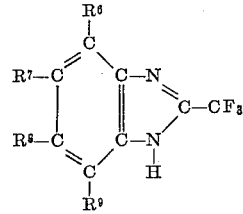

wherein $R^6$, $R^7$, $R^8$ and $R^9$ are hydrogen, halogen or a saturated heterocyclic ring attached through a nitrogen atom and selected from the group consisting of piperidino and morpholino at least two of said groups being halogen and not more than one of said groups being a saturated heterocyclic ring.

4. A method as in claim 2 wherein the materials to be treated are immersed in the treating composition.

References Cited

Grimaldi et al.: Jour. Org. Chem., vol. 27, pp. 227–9 (1962).

Morgan: Jour. Chem. Soc. (London), 1961, pp. 2344–5.

ALBERT T. MEYERS, Primary Examiner

D. M. STEPHENS, Assistant Examiner

U.S. Cl. X.R.

260—309.2; 424—267, 269